(12) United States Patent
Rubinstein et al.

(10) Patent No.: US 7,194,251 B2
(45) Date of Patent: Mar. 20, 2007

(54) INTELLIGENT GATE DISTRIBUTED USE AND DEVICE NETWORK ACCESS MANAGEMENT ON PERSONAL AREA NETWORK

(75) Inventors: Alan Rubinstein, Fremont, CA (US); Gary Wang, Cupertino, CA (US)

(73) Assignee: 3Com Corporation, Malborough, MA (US)

( * ) Notice: Subject to any disclaimer, the term of this patent is extended or adjusted under 35 U.S.C. 154(b) by 380 days.

(21) Appl. No.: 10/082,422

(22) Filed: Feb. 22, 2002

(65) Prior Publication Data

US 2005/0282522 A1    Dec. 22, 2005

Related U.S. Application Data

(60) Provisional application No. 60/285,419, filed on Apr. 20, 2001, provisional application No. 60/277,593, filed on Mar. 20, 2001, provisional application No. 60/277,767, filed on Mar. 20, 2001, provisional application No. 60/277,451, filed on Mar. 20, 2001, provisional application No. 60/277,592, filed on Mar. 20, 2001.

(51) Int. Cl.
    H04M 1/66    (2006.01)
(52) U.S. Cl. .............. 455/410; 455/41.2; 235/379; 235/380; 235/381; 235/382
(58) Field of Classification Search ........... 455/410, 455/411, 412.1, 41.1, 41.2; 235/379, 381, 235/382, 380
See application file for complete search history.

(56) References Cited

U.S. PATENT DOCUMENTS 5,673,322 A    9/1997  Pepe et al. ............... 380/49
6,061,346 A    5/2000  Nordman ................. 370/352
6,518,724 B2*  2/2003  Janik ....................... 320/115
6,796,490 B1*  9/2004  Drummond et al. ...... 235/379
6,915,422 B1*  7/2005  Nakamura ............... 713/155
2002/0143773 A1* 10/2002 Spicer et al. ............ 707/10

FOREIGN PATENT DOCUMENTS

WO       01/17310 A1    3/2001
WO    WO 01/17310 A1 *  3/2001

OTHER PUBLICATIONS

A. Frisch, "Essential System Administration".
Murthy U et al. "Firewalls for Security in Wireless Networks", System Sciences 1998. Proceedings of the Thirty-First Hawaii International Conference in Kohala Coast, HI USA Jan. 6-9 1998, pp. 672-680.
Saito T. et al. "Home Gateway Architecture and It's Implementation" IEEE Translation on Consumer Electronics, IEEE Inc. New York, USA vol. 46, No. 4 Nov. 2000, pp. 1161-1166.

* cited by examiner

Primary Examiner—Matthew D. Anderson
Assistant Examiner—Sanh Phu

(57) ABSTRACT

The present invention relates to a method for managing access to a wireless personal area network in an intelligent concentrator. The method manages wireless access to a network by providing wireless communication in the network, providing firewall protection between the network and a wireless access device, receiving an identification code from the wireless access device to the network, determining whether the identification code is valid, granting network access to the wireless access device when the identification code is valid, denying network access to the wireless access device when the identification code is not valid, and issuing an alert to a network manager when the identification code is not valid. The identification code can be the unique media access code of the wireless access device or any other unique identification code previously registered with the network manager.

13 Claims, 5 Drawing Sheets

INTELLIGENT GATE DISTRIBUTED USE AND DEVICE NETWORK ACCESS MANAGEMENT ON PERSONAL AREA NETWORK

RELATED U.S. APPLICATIONS

This application claims priority to the commonly-owned co-pending provisional patent applications: U.S. patent application Ser. No. 60/277,593, entitled "'INTELLIJACK' PHYSICAL CONCEPTS," filed Mar. 20, 2001, and assigned to the assignee of the present invention; U.S. patent application Ser. No. 60/277,767, entitled "A METHOD FOR MANAGING INTELLIGENT HARDWARE FOR ACCESS TO VOICE AND DATA NETWORKS," filed Mar. 20, 2001, and assigned to the assignee of the present invention; U.S. patent application Ser. No. 60/277,451, entitled "A METHOD FOR FILTERING ACCESS TO VOICE AND DATA NETWORKS BY USE OF INTELLIGENT HARDWARE," filed Mar. 20, 2001, and assigned to the assignee of the present invention; U.S. patent application Ser. No. 60/277,592, "'INTELLIJACK' USAGE," filed Mar. 20, 2001, and assigned to the assignee of the present invention; and U.S. patent application Ser. No. 60/285,419, "INTELLIGENT CONCENTRATOR," filed Apr. 20, 2001, and assigned to the assignee of the present invention.

FIELD OF THE INVENTION

The present invention relates to the field of Personal Area Networking (PAN) and access to those networks by various wireless access devices. More specifically, the present invention relates to a device and system for intelligently managing access to wireless networks.

BACKGROUND OF THE INVENTION

Personal Area Networks are developing as adjuncts to local area networks (LANs). Modern personal area networking (PAN) generally refers to a small group of devices that communicate wirelessly and are normally within a small, personal, area. The PAN usually communicates with a network hub or a server that provides connection to a larger local area network (LAN) and to the Internet. Communication within the PAN is generally by RF or infrared devices and interface with the LAN is usually accomplished by cable connections between the wireless hub and the network server.

The wireless nature of a PAN implies the portability of the devices within it. Devices in the PAN are usually small and often battery powered such as laptop computers, personal data assistants (PDAs), or other wireless devices. There are also protocols for implementing wireless network access for printers, scanners and other computer peripherals in the personal area network. With such portability, wireless access devices are easily transported between physical areas in the workplace as well as away from the workplace altogether.

Security and safety of data in a network can be jeopardized by uncontrolled access to a network by unauthorized users of wireless access devices, by authorized users in areas exposed to observation by unauthorized persons or computers, by users authorized in some areas but not in others, and by authorized network users with unauthorized devices. Wireless access removes what limited restrictions on access as are provided by wired connection.

Existing means of controlling access to wireless networks are similar to those used in the wired arena. They are typically centralized controls residing in a server in a network and dependent on the physical location of the connection point of the various access devices. Wireless access devices reduce the significance of physical location of connection points and thereby their utility in limiting access to authorized users.

What is needed, then, is means of controlling access to wireless networks, such as personal area networks, in order to provide security for those personal area networks against access by unauthorized users and unauthorized devices. Furthermore, such means should not be dependent on the permanent physical location of a connection point.

SUMMARY OF THE INVENTION

Presented herein is a method for controlling access to wireless networks, such as personal area networks, in order to provide security for those personal area networks against access by unauthorized users and unauthorized devices. Furthermore, the method of providing such security is not dependent on the permanent physical location of a connection point.

The present invention relates to a method for managing access to a wireless personal area network in an intelligent concentrator. The method manages wireless access to a network by providing wireless communication in the network, providing firewall protection between the network and a wireless access device, receiving an identification code from the wireless access device to the network, determining whether the identification code is valid, granting network access to the wireless access device when the identification code is valid, denying network access to the wireless access device when the identification code is not valid, and issuing an alert to a network manager when the identification code is not valid. The identification code can be the unique-media access code of the wireless access device or any other unique identification code previously registered with the network manager.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The operation of this invention can be best visualized by reference to the drawings.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on signals within an electronic circuit. These descriptions and representations are the means used by those skilled in the electronic arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in an electronic system.

Figure 1:
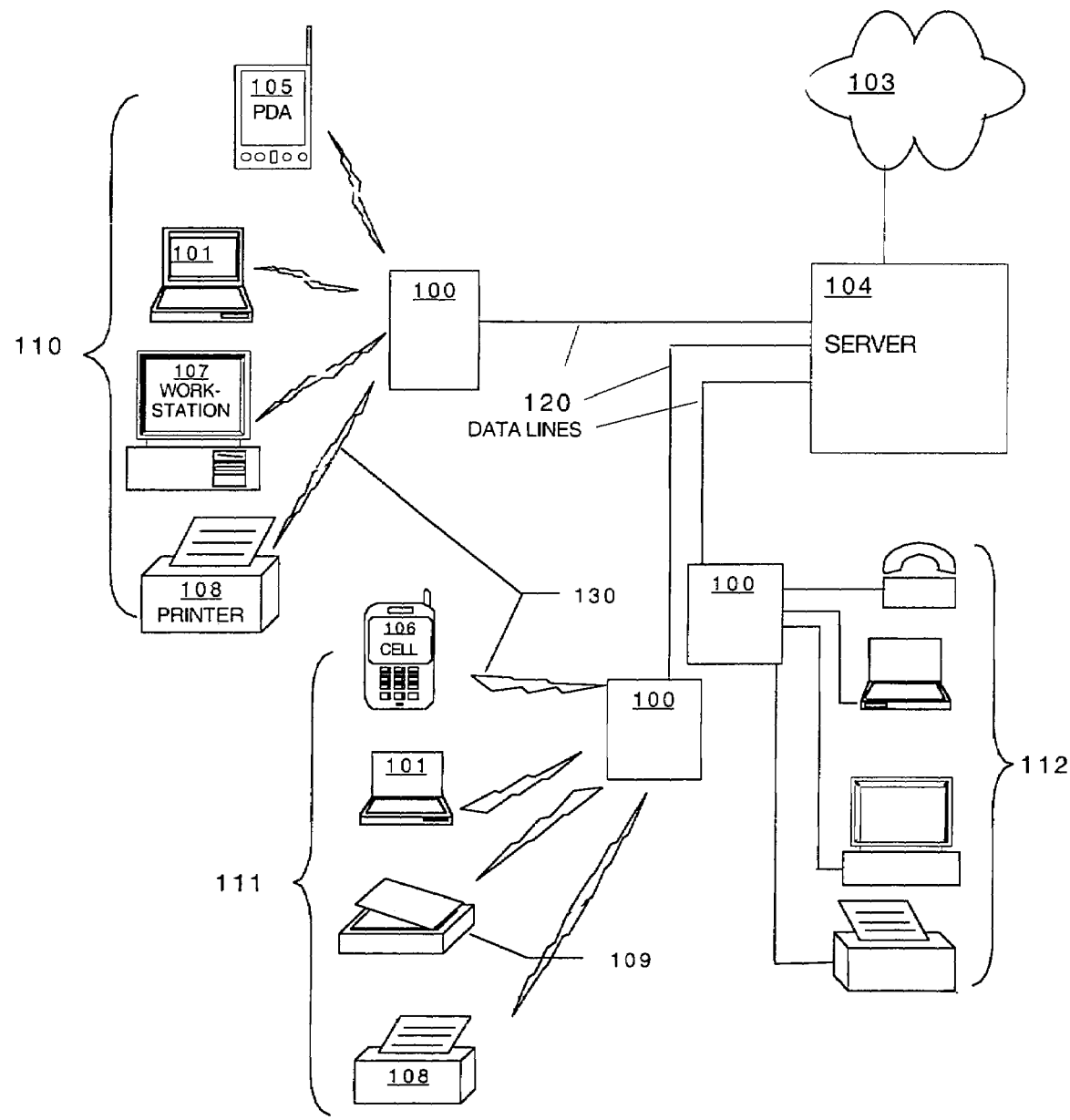
FIG. 1 illustrates a local area network with personal area network adjuncts and internet access.

FIG. 1 illustrates a local area network that includes server 104 and distributed Intelligent concentrators lob connected by data lines 120. Intelligent concentrators 100 act as wireless hubs for work centers 110 and 111 which results in each work center being implemented as a Personal Area Network (PAN). Note here that the term "personal area network" typically refers to a small network linked wirelessly to a larger local area network. Work center 112 is a hard-wired work center but acts in every way the same as a personal area networks except for the restricted motion of the hard-wired devices in the work center all connected to an intelligent concentrator 100. Note that the intelligent concentrator referred to in this discussion is one physical implementation of this embodiment of the present invention. Other embodiments may be implemented in other physical devices.

Personal area network 110 is a typical PAN. It includes wireless access devices 105, a PDA enabled for wireless network access, laptop computer 101, work station 107, and network printer 108. Each of these wireless access devices communicates with intelligent concentrator 100 by means of wireless communication 130 which may be a radio frequency (RF) protocol, such as Bluetooth or some other RF protocol, or infrared (IR).

Note that wireless communication enables and implies a temporary nature to the specific suite of wireless access devices within the personal area network. A user may carry a PDA at all times while moving about the workplace, or even when outside of the workplace, and access the network with it only occasionally. Data-enabled cell phone 106, shown communicating with intelligent concentrator 135 in personal area network 111, is another highly portable wireless access device that would likely access the wireless network on an occasional basis. Yet another possible wireless access device is illustrated by scanner 109. In this embodiment of the present invention, the intelligent concentrators, 100, are enabled to determine, by this embodiment of the present invention and upon each attempt to access the network, whether each wireless access device is an authorized device.

An intelligent concentrator, illustrated at 100 in FIG. 1, is easy to install and reliably provides a hub and connection point for access to Voice & Data Networks. The embodiment of the present invention discussed here is implemented through miniaturized hardware that could be installed inside a wall or in an internal space provided for in an office cubicle. Power is easily supplied using the same hardware, either locally or remotely over network cabling. Access to device power is simultaneously accessible with data line connection in a wired connection. Wireless access devices are commonly battery powered or receive power from some other source.

Figure 2:
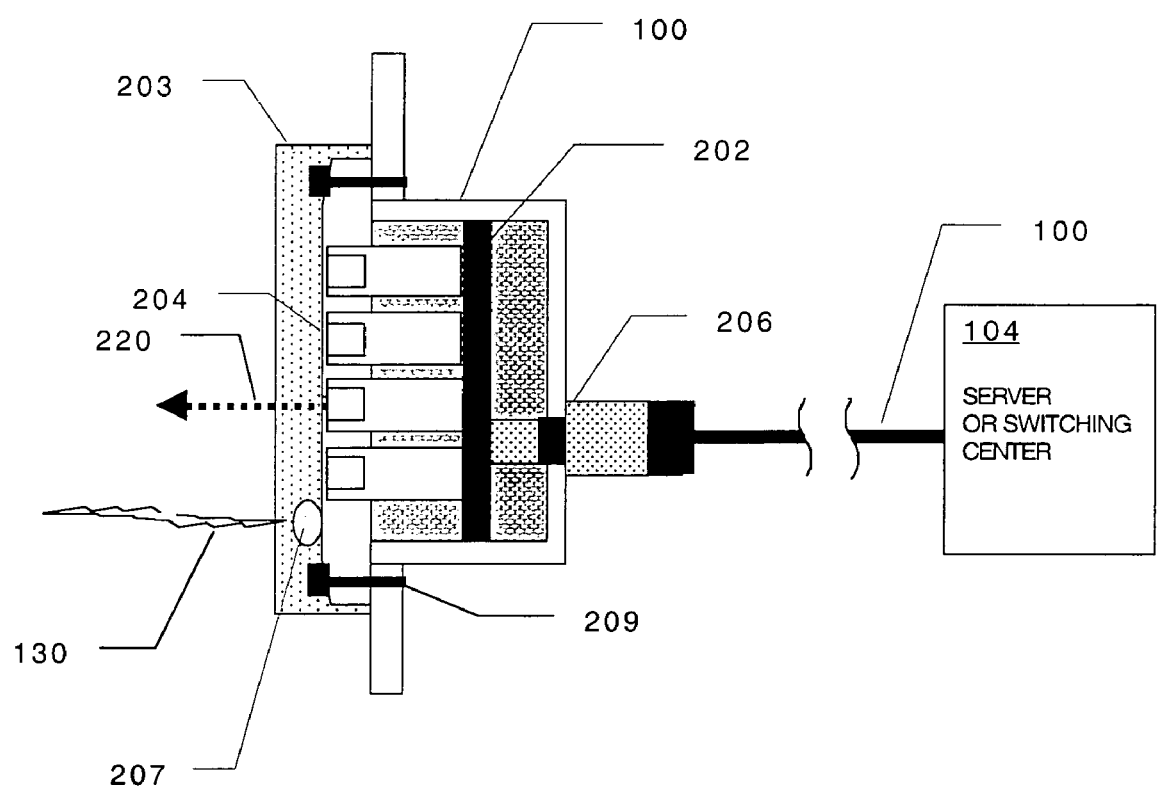
FIG. 2 illustrates a physical implementation of one embodiment of the present invention.

FIG. 2 illustrates a possible configuration for the physical implementation of an embodiment of the present invention. Intelligent concentrator 200 is shown in side cutaway view, with connector jacks 204 for possible wired connections and wireless communication device 207 shown in one of several conceivable arrangements. Wireless communication device 207 is envisioned as being enabled in a variety of protocols. Multiplexing of signals to and from server 104 would very likely be under the control of in-unit electronics suite 202. Those signals, in one embodiment of the present invention, would be multiplexed onto single cable 100 and connect to intelligent concentrator 200 via back-of-unit connector 206.

Also shown in FIG. 2 is an add-on device 203. A range of possibilities exists for the functions of device 203. It could be implemented as an intelligent device, capable of being remotely tested, allowing the network infrastructure and integrity of the network cabling to be tested and evaluated from a central location, without any action being required at the work site. Device 203 can also be implemented as a physical security device, capable of preventing physical attachment to the LAN cabling without a notification being sent to the server that the physical network port has been compromised. Device 203 can also simply be a dust cover installed on an intelligent concentrator that is only involved in a wireless personal area network, obviating the need for wired connectors 204. In one embodiment, wired connectors 204 are implemented as standard communications jacks, such as RJ45. Additionally, status indicator lights are mounted on the surface of the intelligent concentrator in another embodiment.

Figure 3:
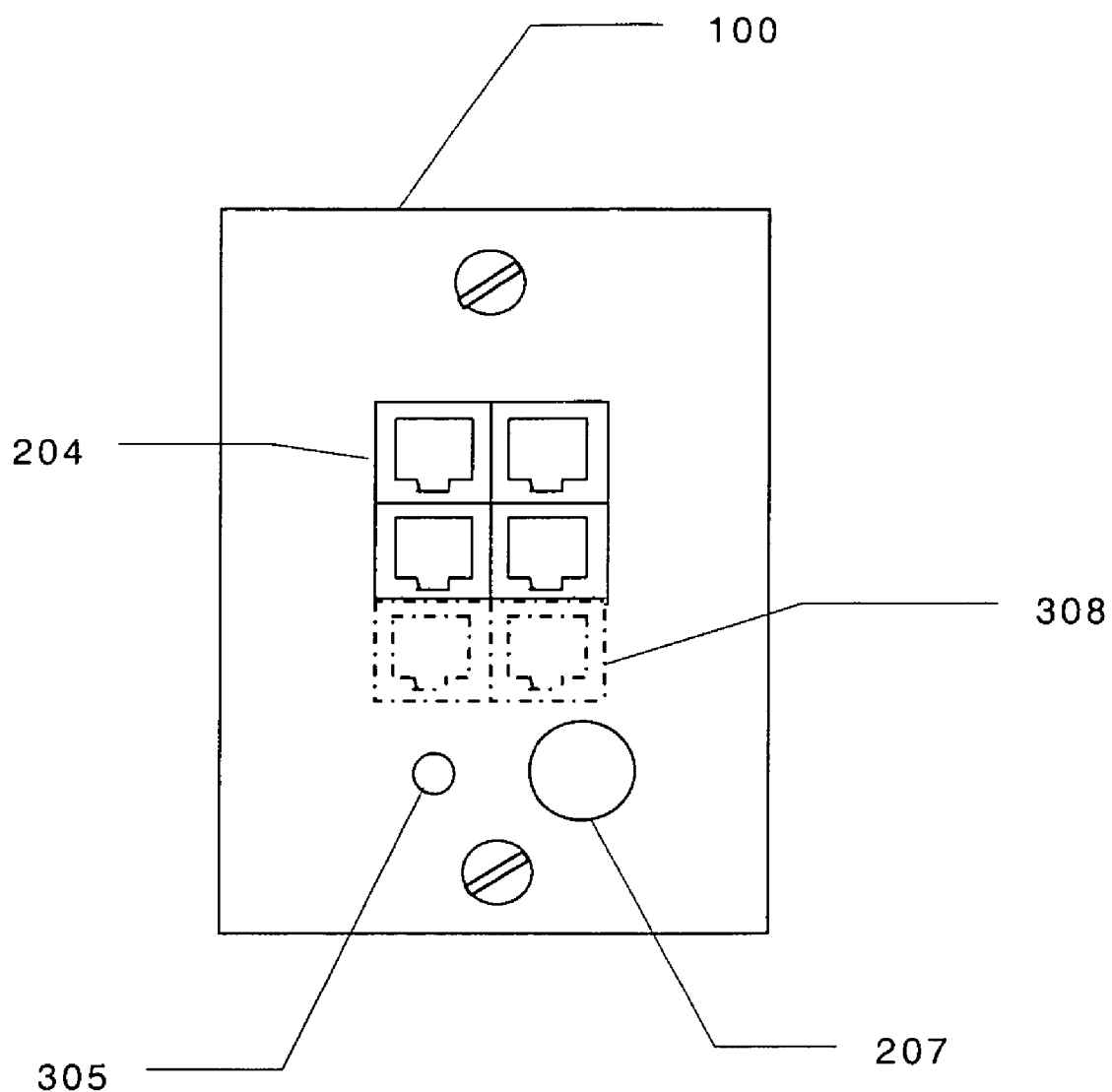
FIG. 3 illustrates a physical implementation of one embodiment of the present invention.

FIG. 3 illustrates one configuration for the user-accessible face of an intelligent concentrator, one physical implementation of this embodiment of the present invention. Intelligent concentrator 100 is shown here with four RJ-45 jacks, 204. There is space, even if an intelligent concentrator takes the form factor of a standard wall plate device, for more jacks, 308. These other jacks could enable a parallel connection to a different network or to a telephone system independent of a LAN or to a number of other envisioned possibilities. FIG. 3 also shows status indicator light 305 which could be implemented in another implementation of this embodiment.

Again shown, in FIG. 3, is wireless communication device 207. Device 207 can be implemented in any number of wireless standards for wireless connection to the network. The necessary transceiver electronics for device 207 are contained in the body of concentrator 100, integral with internal electronics 202 in FIG. 2. Other implementations could implement the circuitry in other ways, however. Power for communications device 207 and its associated circuitry can, like that for intelligent electronic circuitry 202 and device 203, be received via multiplexed cabling.

Figure 4:
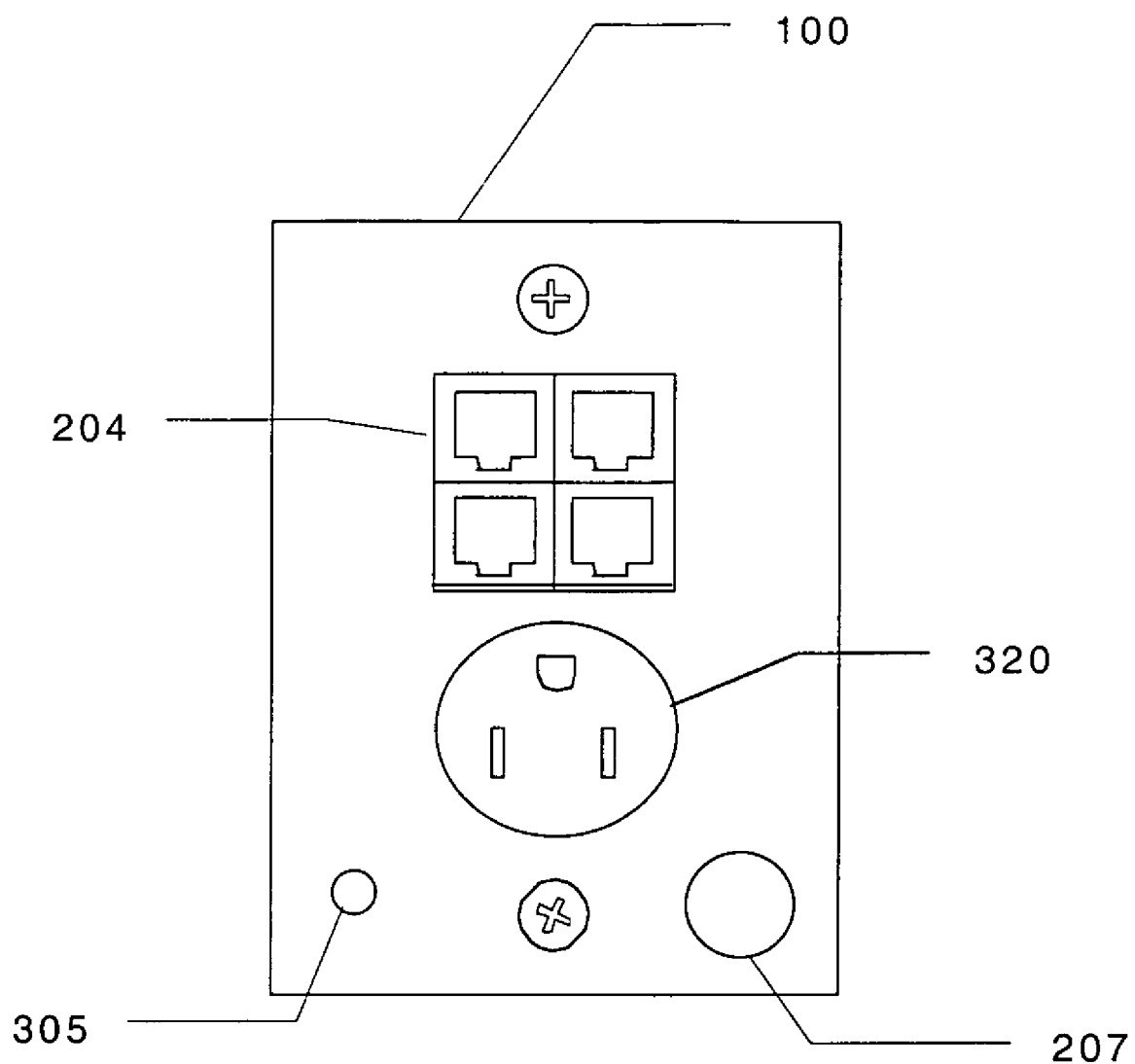
FIG. 4 illustrates a physical implementation of one embodiment of the present invention.

FIG. 4 illustrates one implementation for supplying device power. Here utility socket 320 is shown in order to illustrate the application of high voltage or current power that reaches the intelligent concentrator via cabling parallel to the data cabling. With access to the power being through intelligent concentrator 200, management and control of a power supply to a device can still be maintained even though the data is communicated wirelessly. The illustration of a utility power socket is not meant to imply that there is some special application of utility AC power in this embodiment. It is solely meant to illustrate a parallel application of high-voltage power through an intelligent concentrator.

Figure 5:
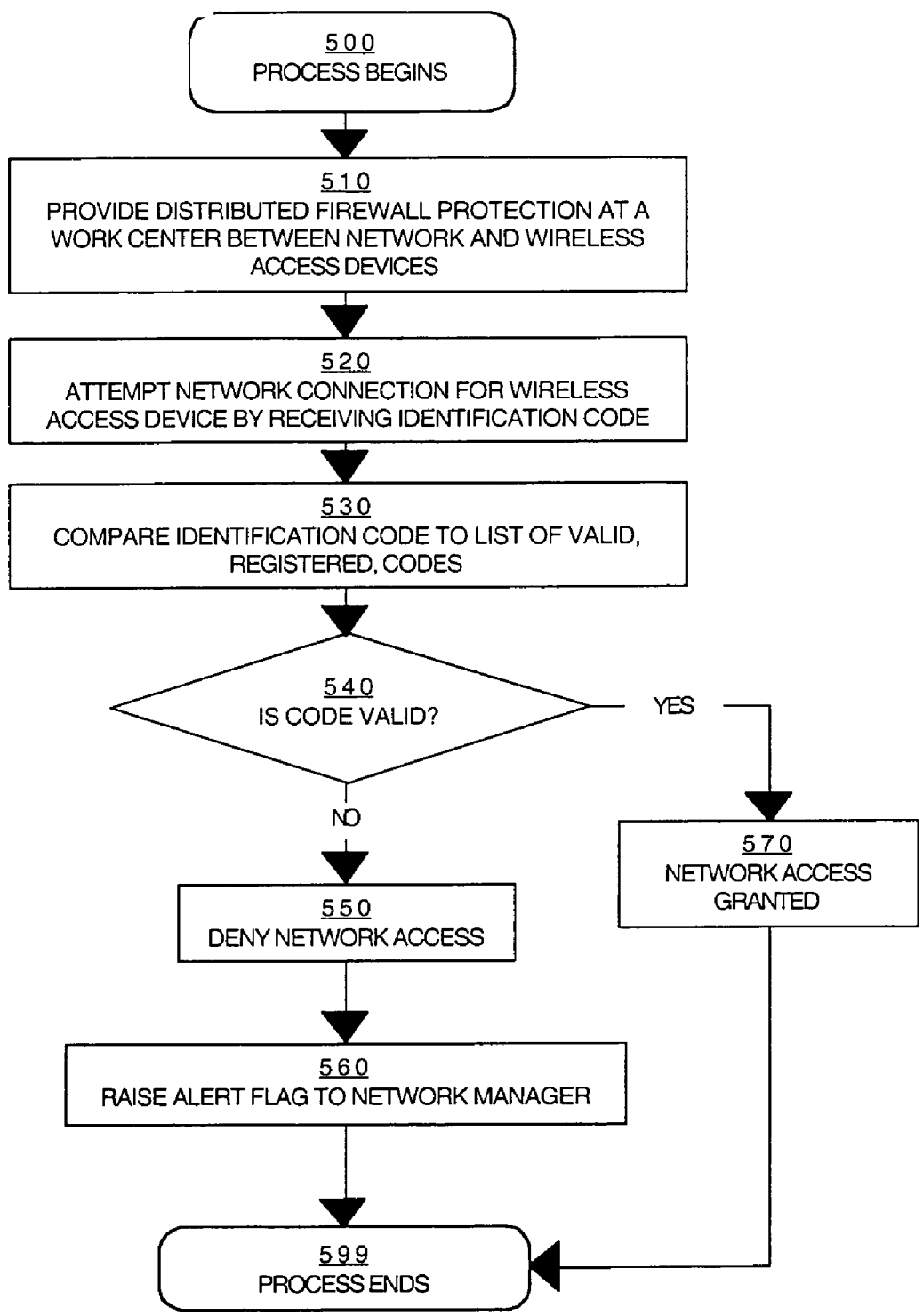
FIG. 5 illustrates a block flow diagram of one embodiment of the present invention.

FIG. 5 illustrates a block flow diagram of one embodiment of the present invention. There, in process 500, a distributed firewall is provided at 510 for each applicable network work center. Network wireless access devices, such as computers, PDAs, data-enabled cell phones, and computer peripherals, attempt network access by submitting a unique identification code which is received by the distributed firewall at 520. At 530, the submitted identification code is compared to a list of valid, registered identification codes. If the submitted code is valid, 540, network access is granted at 570 and the process ends at 599. If the identification code is not valid, network access is denied at 550 and an alert flag is raised to the network manager, 560. Again, the process ends at 599.

A significant advantage offered by this embodiment is in the uniqueness of the list of valid identification codes, in this embodiment media access codes (MACs), that is supplied to each distributed firewall when the network is started. Note that the MAC (Media Access Control) address is a device's unique hardware number. On an Ethernet LAN, it is generally the same as the device's ethernet address. When a device is connected to the Internet from a computer or host, a correspondence table relates the IP address to the computer's physical address on the LAN.

Each distributed firewall has its own unique identification with the network manager and is given the list of codes applicable to that particular distributed firewall. The network manager, for example, can have a wireless laptop computer whose identification code is on every list issued in the network. Then the network manager can access the network from any personal area network location in the entire network. A personal area network user can have a PDA that is valid for access at the user's workstation and also at a laboratory that the user often works in.

In another example of the utility of this embodiment of the present invention, if two users have personal area networks adjacent to each other, their wireless access devices have unique codes that are not found on each other's applicable valid code list. In that way, restrictions can be implemented that prevent cross-talk between personal area networks and can also provide a layer of network authorization management.

Some distributed firewalls can be implemented with unlimited valid codes but with limited network access to wireless devices that access the network though those firewalls. This is useful in a company lobby where visitors can use their own wireless access devices to access the network as far as phone directories and promotional information but not as far as entry into restricted network areas.

In one embodiment of the present invention, the distributed firewall is implemented as firmware in an intelligent concentrator. In another embodiment, the firewall is implemented as software in a wireless network hub where it is in control of access from several personal area networks that are centered on the same physical hub. A common thread between these implementations is the distributed access control afforded to the distributed firewalls by the separate maintenance of the valid access code lists.

Each list in this embodiment of the present invention contains information such as a unique firewall identification code, the physical residency and location of the firewall, a list of designated users, and a list of registered MAC addresses. The list of users for a work station personal area network can be as small as to include only the network manager and the personal area networks primary user. The list for a firewall associated with a conference room, for example, can have no restrictions on users but significant limitations on network resources that are accessible from the conference room.

The number of possible variations in access lists is limited only by network and workplace needs. This embodiment affords an extremely adaptable wireless network access management tool to the network manager.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A method for managing access to a network, comprising:
    providing wireless communication in a network;
    providing a plurality of distributed firewall units in the network, each firewall unit configured to provide wireless access to the network for a set of valid wireless access devices associated with the firewall unit;
    receiving, at a particular one of the plurality of distributed firewall units, an identification code transmitted wirelessly from a wireless access device, said identification code a media access control number of the wireless access device;
    determining whether said identification code is valid for the particular firewall unit grant network access to the wireless access device;
    granting network access at the particular firewall unit to said wireless access device when said identification code is valid;
    denying network access at the particular firewall unit to said wireless access device when said identification code is not valid.

2. The method described in claim 1, wherein said providing said wireless communication is accomplished with an intelligent concentrator enabled for wireless communication.

3. The method described in claim 2, wherein said providing said wireless communication is accomplished in circuitry resident in said intelligent concentrator.

4. The method described in claim 1, wherein said determining whether said identification code is valid is accomplished by reference to a list of valid identification codes associated with the particular firewall unit.

5. The method described in claim 4, wherein said list of valid identification codes is resident in said firewall unit.

6. The method described in claim 4, wherein said list of valid identification codes is resident in a server in said network.

7. The method described in claim 1, wherein said denying said access to said network at the particular firewall unit is accomplished simultaneously with granting access to wireless accesses devices with valid identification codes.

8. The method described in claim 1, wherein said network is a wireless personal area network.

9. An intelligent concentrator, comprising:
a housing configured to be mounted within a cavity in a wall, said housing including a first interface at an internal part of the wall and a second interface external to and substantially planar with en external part of the wall;
a cable connector coupled to said housing at the first interface and adapted to communicatively couple said intelligent concentrator to a network data cable;
electronic circuitry mounted in said housing enabled to wirelessly communicate with a wireless access device and a network; and
a distributed firewall resident in said electronic circuitry wherein said firewall is enabled to control the access to said network of said wireless access device only at the intelligent data concentrator by determining whether an identification code transmitted from said wireless access device is included in a set of valid identification codes identifying wireless access devices associated with the intelligent data concentrator, said identification code a media access control number associated with said wireless access device.

10. The intelligent concentrator described in claim 9, wherein said intelligent concentrator is enabled as a hub of a personal area network.

11. The intelligent concentrator described in claim 9, wherein said distributed firewall is enabled to obtain a list of valid identification codes from a server in said network.

12. The intelligent concentrator described in claim 9, wherein said distributed firewall is enabled to deny access to said wireless access device if said identification code is not valid.

13. The intelligent concentrator described in claim 9, wherein said distributed firewall is enabled to issue an alarm to a network manager is said identification code is not valid.

* * * * *